No. 722,731. PATENTED MAR. 17, 1903.
H. S. MACKAYE.
TOY.
APPLICATION FILED MAR. 5, 1895.
NO MODEL.
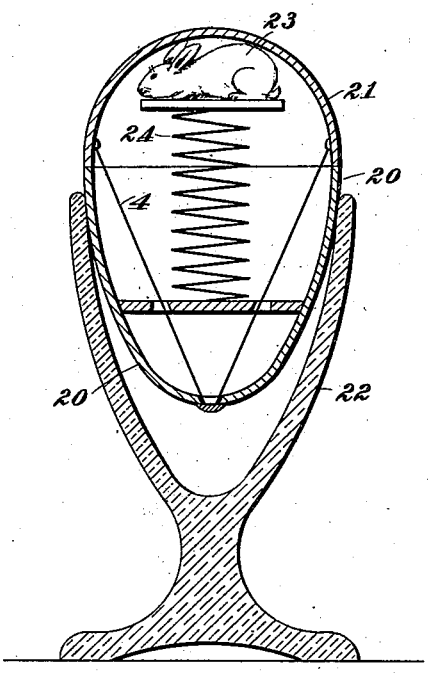
Witnesses:
Edward Briscoe
Walter Scott.
Inventor:
Harold S. MacKaye

UNITED STATES PATENT OFFICE.

HAROLD S. MacKAYE, OF NEW YORK, N. Y.

TOY.

SPECIFICATION forming part of Letters Patent No. 722,731, dated March 17, 1903.

Application filed March 5, 1895. Serial No. 540,637. (No model.)

*To all whom it may concern:*

Be it known that I, HAROLD S. MACKAYE, a citizen of the United States, residing in the city of New York, in the county and State of New York, have invented a new and useful Improvement in Toys, of which the following is a specification.

My invention has reference particularly to a form of Easter egg affording surprise and amusement to children. This egg, by the dissolving of a soluble cement of any kind in water, seems to open as though in hatching and may be made to contain any desirable toy or pleasing article.
The device is shown in median section in the accompanying drawing in a preferred form.

As shown in the drawing, an egg, which may be a natural blown egg or an artificial structure, is divided into an upper and lower part, as at 21 and 20. The cup 22 may be any well-known egg-cup and forms no part of this invention.

The article supposed to be hatched out of the egg is shown as a small rabbit 23, carried by a spring 24. The tendency of this spring is to open the egg, but the retaining means, such as the threads 4, are attached to the upper part of the egg and are secured at the tip of the egg after passing through a small hole there by any soluble cement or gum—such as gum-arabic, for instance.

The egg is used as follows: A little water, preferably warm, is poured into the bottom of the egg-cup 22, and the egg is put tip down into this cup. The gum-arabic or other cement is softened, and the spring 24 soon pushes the cover of the egg upward, disclosing the rabbit or other contained toy or other article.

What I claim is—

1. An artificial egg having a cover portion, and containing a spring-actuated figure; in combination with a retaining means for said cover, and a cement for fastening said means, said cement being more or less soluble in water.

2. An artificial egg having a cover portion and a spring tending normally to open the same; in combination with a cement-secured retaining means for said cover, said cement being more or less soluble in water, and so placed as to be accessible for wetting.

In witness whereof I have set my hand hereto this 19th day of January, 1895.

HAROLD S. MACKAYE.

Witnesses:
LORENZO C. CARUANA,
DRURY W. COOPER.